(12) United States Patent
McNeil

(10) Patent No.: US 6,694,928 B2
(45) Date of Patent: Feb. 24, 2004

(54) COMBUSTION OF FATS AND OILS

(75) Inventor: John McNeil, Gravesend (GB)

(73) Assignee: Otwoempower Corp., Nassau (BA)

( * ) Notice: Subject to any disclaimer, the term of this patent is extended or adjusted under 35 U.S.C. 154(b) by 1 day.

(21) Appl. No.: 10/147,207

(22) Filed: May 16, 2002

(65) Prior Publication Data

US 2002/0189243 A1 Dec. 19, 2002

Related U.S. Application Data

(63) Continuation of application No. 09/744,448, filed as application No. PCT/GB99/02405 on Jul. 23, 1999, now abandoned.

(30) Foreign Application Priority Data

Jul. 24, 1998 (GB) .............................................. 9816244
Apr. 21, 1999 (GB) .............................................. 9909199

(51) Int. Cl.[7] .............................................. F02B 75/12
(52) U.S. Cl. ......................................... 123/1 A; 123/23
(58) Field of Search .................. 60/597, 618; 123/1 A, 123/23, 198 A

(56) References Cited

U.S. PATENT DOCUMENTS

| | | | |
|---|---|---|---|
| 4,440,115 A | * 4/1984 | Allen | 123/1 A |
| 4,881,373 A | * 11/1989 | Yamaguchi et al. | 60/732 |
| 4,899,544 A | * 2/1990 | Boyd | 60/618 |
| 5,117,800 A | * 6/1992 | Watson et al. | 123/575 |
| 5,327,987 A | * 7/1994 | Abdelmalek | 60/618 X |
| 5,636,619 A | 6/1997 | Poola et al. | 123/585 |
| 6,003,303 A | * 12/1999 | Peter-Hoblyn et al. | 60/274 |

FOREIGN PATENT DOCUMENTS

| | | |
|---|---|---|
| DE | 3117374 | 12/1982 |
| DE | 3246485 | 7/1985 |
| DE | 4205958 | 9/1993 |
| EP | 0237816 | 9/1987 |
| EP | 0546649 | * 6/1993 |
| GB | 2 117 053 A | 2/1983 |
| JP | 61152956 | * 11/1986 |
| WO | 81/03202 | * 11/1981 |

OTHER PUBLICATIONS

Sims et al, 1990, CA Conference Article, Tallow esters and vegetable oil esters–lessons learnt from the New Zealand Research Programme.*
"Tallow Diesel", Industrial Agricultural Products Center, 1999.*
Kinder, Gary, "Ship of Gold in the Deep Blue Sea", Abacus, 1998.

* cited by examiner

Primary Examiner—Hoang Nguyen
(74) Attorney, Agent, or Firm—McCormick, Paulding & Huber LLP

(57) ABSTRACT

The invention relates to a method of combusting tallow, and particularly tallow that may be contaminated with the prion protein considered to be responsible for spreading the Bovine Spongiform Encephalopathy (BSE) infection in cattle, in a standard high-speed compression ignition engine. The invention also extends to combustion of other animal/vegetable-based fats and oils, particularly waste cooking oils which are at risk of contamination by toxic chemicals which may potentially enter the food chain. The heat and power produced by the engine may then be used to generate electricity. In accordance with the invention, the tallow, etc. is combusted in an enriched oxygen atmosphere in the combustion chamber of the engine.

23 Claims, 3 Drawing Sheets

TALLOW POWER GENERATION SYSTEM

SCHEMATIC ILLUSTRATION OF DIESEL CYLINDER HEAD

COMBUSTION OF FATS AND OILS

REFERENCE TO PRIOR APPLICATIONS

This application is a continuation application of U.S. patent application Ser. No. 09/744,448 filed Jan. 24, 2001 and is entitled to the benefit of and incorporates by reference essential subject matter disclosed therein.

The present invention relates to a method of combusting tallow, and particularly tallow that may be contaminated with the prion protein considered to be responsible for spreading the Bovine Spongiform Encephalopathy (BSE) infection in cattle, in a standard high-speed compression ignition engine. The invention also extends to combustion of other animal/vegetable-based fats and oils which are at risk of contamination by toxic chemicals which may potentially enter the food chain. The heat and power produced by the engine is preferably then used to generate electricity.

Tallow is a clarified animal fat manufactured by rendering the remains of animals. As a result of the cattle-culling program introduced in the United Kingdom, to eradicate BSE from the national cattle herd, the UK stock of segregated tallow from the cull has grown to significant proportions. There may also be a link between BSE and a new variant of Creutzfeldt-Jacob Disease (CJD) in humans. The European Union has therefore stipulated that the UK stock of tallow, and any other potentially contaminated tallow stored in Europe, has to be disposed of by incineration to avoid potential risk of human or bovine infection.

The prion protein that may be responsible for the spread of BSE infection is heat resistant and is believed to be capable of withstanding a temperature of 800° C. For safety reasons the tallow therefore has to be destroyed by an effective means of high temperature incineration.

Also to prevent the pollution of waterways, which can occur if used cooking oil is poured down drains, caterers and consumers are being encouraged to save waste cooking oil for collection and subsequent reprocessing into either animal feed or detergent products. However, there is always a danger that used cooking oil taken from public collection facilities may have been inadvertently contaminated by other toxic chemicals, especially chemical components found in waste mineral oils, such as transformer or lubricating oils. These types of waste mineral oil can be heavily polluted with toxic, carcinogenic, polycyclic organic compounds, in particular dioxins, furans and polychlorinated biphenyls (PCBs). Cross contamination caused a food scare in Belgium in early 1999, when it is believed that waste transformer oil containing dioxins and PCBs became mixed with used cooking oil in a public recycling container. Dioxins and PCBs are thermally stable chemicals that accumulate in fat. After the recycled oil was processed into animal feed the contaminants remained in the feed and were consequently passed into the human food chain.

Dioxins, furans, PCBs and similar polycyclic organic compounds can only be effectively destroyed by high temperature incineration.

A compression ignition engine works by injecting fuel, under high pressure, into air that has been compressed by a piston travelling up a cylinder. The fuel and air mixture is further compressed until it becomes hot enough to ignite the fuel. This results in a rapid increase in temperature and pressure inside the cylinder and the piston is forced back down the cylinder. Peak cylinder pressures inside the combustion chamber can be over 140 bar and the mean combustion temperature can reach over 2000° C.

Combusting tallow or potentially contaminated cooking oils under these high temperature conditions would be an effective way of ensuring that the tallow or oil was completely incinerated, and any contaminants contained therein would be effectively destroyed. A further benefit is that the fuel would be injected into the engine in small, discrete doses and in the event of machine breakdown or maintenance only a small amount of potentially contaminated fuel would need to be isolated from the fuel inlet pipe.

However, high-speed compression ignition engines tend to be very fuel specific and only operate efficiently on the petrochemical-based fuels that have been designed for this particular type of engine.

An engine manufacturer will normally supply a specification rating for the engine, including a recommended power output and optimum speed setting for continuous operation of the engine. This is based on a specific type of fuel i.e. diesel oil for compression ignition engine. The engine is not designed to run on other types of fuel. Often a maximum power output (at the optimum speed) is also specified, and beyond this level it is expected that inefficient combustion would occur and undesirable black smoke would be produced. Tallow, being an animal fat, has a different chemical structure to petrochemical oils and its properties, such as calorific value, viscosity, cetane number, flash point and specific gravity, are unlike mineral oils. Consequently, tallow and other animal/vegetable based oils or fats do not burn efficiently in standard high-speed conventional diesel engines and carbonaceous deposits are quickly formed in the combustion chamber, on the piston and around the valves and the fuel injector. The presence of high levels of pollutants in the exhaust gas, such as carbon monoxide, unburned hydrocarbons and particulates, is further confirmation of incomplete and inefficient combustion.

The present invention seeks to provide a method by which tallow and other animal/vegetable-based fats and oil at risk of contamination can be successfully burnt in a compression ignition engine. From a first broad aspect, therefore, the present invention provides a method of combusting tallow in a compression ignition engine wherein the combustion atmosphere is enhanced with oxygen.

In addition or alternatively to tallow, mixtures of animal- and vegetable-based oils and fats, particularly cooking oils, may be burnt in a compression ignition engine in the method of the invention. Whilst it is contemplated that such mixtures would primarily consist of animal fats and oils (e.g. greater than 50%, 60% or 70% animal-based fats/oils) it will be appreciated that where desirable, much smaller proportions of animal fats/oils may be used in combination with other types of oil such as vegetable oils, as long as the combustion properties of the mixture are suitable for oxygen-enriched combustion.

From a second aspect therefore, the invention provides a method of combusting waste cooking oil in a compression ignition engine wherein an enriched oxygen atmosphere is provided in the combustion chamber of the engine.

Enhancement of the oxygen levels in the combustion atmosphere has been found, unexpectedly to allow the successful combustion of tallow and potentially contaminated oils, thereby affording a mechanism by which it may be disposed of effectively. As tallow has a lower calorific value than diesel fuel oil, for a given power output more tallow is required than diesel oil. However, fuel economy is of less concern than the safe destruction of any potential contaminants in the tallow.

Effective destruction of any prion protein that may be present in the tallow or potential contaminants in other oils and fats is dependent on both a high mean temperature inside the combustion chamber and the length of time the combustion process is held at that high temperature.

In a preferred embodiment, a high mean combustion temperature is achieved by injecting more fuel into the engine to produce a higher than normal power output, whilst running the engine at its optimum speed. The increased oxygen concentration ensures that the extra fuel can be effectively combusted, thus generating higher than normal thermal energy inside the combustion chamber. In this regard, as the invention is primarily intended for the generation of electrical power, the engine will be set to operate at its best continuous speed.

Oxygen enhancement also leads to earlier ignition of the fuel, so that the fuel has longer to burn. Accordingly, in the preferred embodiment no adjustment is made to the normal mechanical timing of the engine to compensate for this earlier fuel ignition. This will ensure a longer and more complete fuel burn, and this is particularly beneficial to effectively combust the extra fuel required to produce higher power outputs. In this context 'normal' is the conditions or engine settings that would customarily be used to run standard diesel oil.

The continuous power output could even be beyond the maximum recommended by the engine manufacturer for regular diesel fuel. Running the engine at higher than normal continuous power raises the mean temperature in the combustion chamber and also increases the exhaust gas temperature.

This combination of increased heat of combustion and higher exhaust temperature ensures that prion protein or any other potential biological contaminants that may be in the tallow or contaminants in the oil will be effectively destroyed. The increased heat and power produced by combusting tallow in this manner can be used to efficiently generate electricity.

From a second aspect therefore, there is provided a method of generating electrical power comprising combusting tallow or potentially contaminated oil in a compression ignition engine having an enhanced oxygen combustion atmosphere, the engine being operated at a higher continuous power output than the normal recommended output of the engine so as to increase the combustion temperature, and connecting said engine to an electrical power generator.

An advantage of using tallow for electrical energy generation is that it is a renewable, sustainable, non-fossil fuel. Tallow has a limited carbon chain chemical structure and contains very low levels of sulphur, chlorine and heavy metals. It therefore burns cleanly in an enriched oxygen atmosphere without producing significant quantities of some of the pollutants associated with fossil fuels, such as sulphur dioxide and chlorine acid gases.

In addition, when tallow is burned, the carbon dioxide produced is not a net contributor towards the greenhouse gas effect. The carbon dioxide released during combustion is merely replacing the carbon dioxide originally sequestered by the plants that were eaten by the animals during the natural growing cycle.

In a typical system in accordance with the invention, one or more diesel engines are connected to an oxygen enriched air supply system and to a supply of tallow that may be either in a pure or a contaminated state or another potentially contaminated oil supply. The output shaft of the engines would be coupled mechanically to one or more electrical power generating devices. Because of the improved thermal efficiency and increased energy density, which can be attained with oxygen enrichment of the combustion atmosphere, the exhaust gas stream is hotter than is usual in a compression ignition engine. Preferably, therefore, this hot exhaust gas is used produce steam to power a further electrical generator system. Furthermore, any excess steam is preferably used for local heating.

Before entering a flue, undesirable gaseous products of high temperature combustion can be abated from the exhaust gas stream. For example, oxides of nitrogen (NOx) can be removed from the exhaust gas by means of catalytic reduction with ammonia. In this way, the system can be used to generate electricity cleanly whilst at the same time safely destroying any potential contaminants that may be present in the fuel.

In order to achieve combustion of tallow or potentially contaminated oils in the engine, the level of oxygen enrichment required may be as little as 1% above normal (i.e. 22% oxygen). However in order to achieve effective combustion having a higher combustion temperature and a longer combustion time, the level of oxygen enrichment supplied to the engine will preferably be at least 2% (i.e. 23% oxygen), more preferably between 3 and 6% above normal (i.e. between 24% and 27% oxygen) and still more preferably between 4 and 5% above normal (i.e. between 25% and 26% oxygen). At the preferred relatively low level of increased oxygen concentration, (i.e. between 25% and 26% oxygen), the oxygen rich air is safe to handle and would not cause oxidation damage to the engine components. It is also reasonably economic to supply he oxygen required for this low level of oxygen enrichment.

The enriched oxygen air can be supplied by a number of commercially available means, including gas separation membranes, pressure swing adsorption, vacuum swing adsorption and cryogenic systems.

A sensor that monitors the temperature and composition of the exhaust gas stream may, in part, control the combustion process That sensor may, for example, be linked to a valve in the air supply to the engine and said valve can adjust the oxygen concentration in the intake air to ensure the desired optimum combustion conditions. Other aspects of the engine operation, such as speed (engine revolutions), power output, fuel consumption and engine temperatures, will be monitored and controlled by the engine management system that is usually supplied by the engine manufacturer. However, it is generally desirable to determine the desired or optimum carbon monoxide (CO) level in the exhaust gas stream as this is a good indicator of the efficiency of combustion, and to control and maintain the desired CO level by adjusting the oxygen inlet concentration accordingly. The overall oxygen concentration will remain steady but minor adjustments may be made within say a limited range of e.g. ±0.5%. in order to maintain the outlet CO levels approximately constant.

Although all contaminants should have been destroyed in the combustion chamber, it is preferable that after leaving the engine, the exhaust gases are held for a period of time at an elevated temperature to provide further sterilisation of the exhaust gas stream. Preferably the temperature is up to at least 500° C. and may be up to 800° C. or even higher. Most preferably however the temperature will be between 500 and 800° C. This may be achieved by suitable thermal insulation of the exhaust.

Some preferred embodiments of the present invention will now be described by way of example only with reference to the following examples and the accompanying drawings and in which.

Tallow consists of animal fats, whereas diesel fuel oil, the normal fuel used in compression ignition engines, consists of a more combustible mixture of alkanes and aromatic compounds. The properties of tallow are very different to those of diesel fuel oil, as illustrated in Table 1:

TABLE 1

Typical Properties of Diesel Oil and Tallow

| Properties | Diesel Oil | Tallow |
|---|---|---|
| Calorific Value MJ/kg | 43 | 39 |
| Density g/cm$^3$ | 0.83 | 0.92 |
| Viscosity at 40° C. cSt | 2.1 | 48.9 |
| Flash Point ° C. | 61 | 222 |
| Pour Point ° C. | −30 | 27 |
| Composition Mass % | C = 86; H = 14 | C = 77; H = 12; O = 11 |

To confirm that tallow could be effectively burned in a compression ignition engine, with the aid of an enriched oxygen atmosphere in the combustion chamber, practical trials were carried out in the laboratory. A Lister-Petter two cylinder, four-stroke diesel, with direct fuel injection and a nominal capacity of one liter, was used as the test engine.

The engine was run at its point of maximum thermal efficiency that is when the maximum Brake Mean Effective Pressure was achieved throughout the engine revolution range. The best operating BMEP was found to occur at a speed of 2300 rpm, and this corresponded to the optimum speed recommended by the engine manufacturer for continuous running using diesel oil. The engine was operated in a special test rig, where the mechanical load consisted of a high power direct current motor with a variable field voltage. The engine was operated at approximately 1-kWe load increments, under continuous running conditions, from the minimum stable load to the maximum sustainable load, based on the exhaust temperature and carbon monoxide emission level, and whilst remaining within the recommended thermal constraints of the engine. The engine manufacturer recommended that the most favourable power output for continuous running at 2300 rpm, when using diesel oil, was 9-kWe. The maximum smoke limited power output, when running at a speed of 2300 rpm, was recommended to be 11-kWe.

To establish the normal engine operating parameters, the engine was initially run naturally aspirated (21% oxygen, 79% nitrogen) using regular diesel oil as fuel. The fuel consumption, exhaust emissions of carbon monoxide and nitrogen oxides, exhaust temperature, peak cylinder pressure and smoke opacity were recorded at each different power increment.

The presence of carbon monoxide in the exhaust gas is a sign of incomplete combustion and the level of carbon monoxide provides a good indication of the efficiency of the engine operation.

Figure 1:
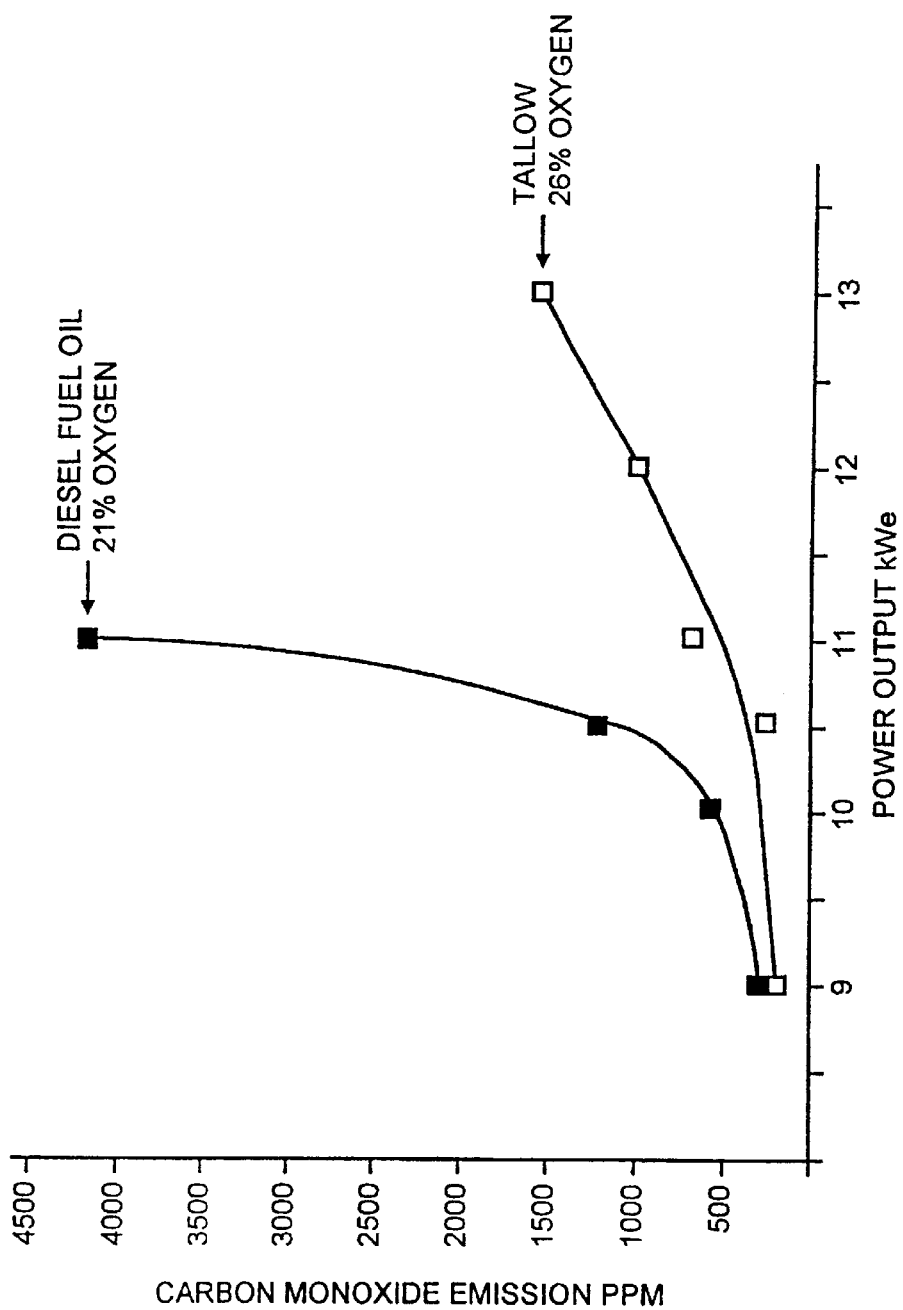
FIG. 1 illustrates graphically the measured concentration of carbon monoxide in the exhaust gas, at the higher power outputs, when using diesel oil as fuel and under naturally aspirated combustion conditions (21% oxygen) and tallow under oxygen enriched conditions (26% oxygen).

FIG. 1 illustrates graphically the measured concentration of carbon monoxide in the exhaust gas, at the higher power outputs, when using diesel oil as fuel and under naturally aspirated combustion conditions (21% oxygen).

The minimum level of carbon monoxide emission was achieved at a power output of around 8-kWe. The minimum stable power output was established to be about 5-kWe. Between 5-kWe and 9-kWe the level of carbon monoxide in the exhaust was relatively steady and within a range of 250 to 350 ppm. Beyond 9-kWe, however, the level of carbon monoxide in the exhaust gas started to increase, and beyond 10-kWe the level increased dramatically. At a continuous power output of 11-kWe the concentration of carbon monoxide was over 4000 ppm and the exhaust gas had an undesirable black smoke profile, which suggested that the engine was unable to completely combust the fuel. The results achieved at a power output of 11-kWe were in line with the recommendation made by the engine manufacturer and confirmed that this was probably the maximum smoke limited rating for the engine operating on diesel oil.

Pre-filtered tallow, heated to 50° C., was then used to fuel the engine. The engine was first run at an enriched oxygen level 20% above normal (41% oxygen, 59% nitrogen), at each power increment, and then under decreasing oxygen concentrations, reduced initially in steps of 2% and then 1% steps at lower concentrations, until normally aspirated conditions were reached (21% oxygen, 79% nitrogen). Again, the fuel consumption, exhaust emission levels, exhaust temperature, peak cylinder pressure and smoke opacity were recorded at each operating step and power increment.

Although it was possible to initiate engine operation using tallow under naturally aspirated combustion conditions, emission profiles were poor and it was unlikely that sustained continual engine operation could be achieved.

The results showed that tallow could be effectively combusted at oxygen enrichment levels of between 3 and 6% above normal (i.e. between 24 and 27% oxygen). The preferred optimum oxygen enrichment conditions to provide efficient combustion, at an economic oxygen cost, were established to be between 4% and 5% above normal (i.e. between 25% and 26% oxygen).

FIG. 1 graphically illustrates the concentration of carbon monoxide in the exhaust gas at higher outputs when using tallow as fuel and an enriched oxygen combustion atmosphere 5% above normal (26% oxygen).

Between 5-kWe and 9-kWe power output the carbon monoxide levels with oxygen enriched tallow were similar to those of naturally aspirated diesel oil. Surprisingly, however, it was found that increasing the power output beyond 9-kWe did not significantly increase the carbon monoxide concentration in the exhaust gas. This observation is illustrated in Table 2, which compares the results of running naturally aspirated diesel oil and oxygen enriched tallow in the engine at a continuous power output of 10.5-kWe, some 15% above the optimum level recommended for the engine. For ease of comparison, most of the results in Table 2 are given as figures relative to the naturally aspirated engine running on diesel oil.

TABLE 2

Continuous Engine Trials Using Tallow and Diesel Oil

| Properties | Diesel Oil 21% Oxygen | Tallow 26% Oxygen |
|---|---|---|
| Actual Power Output kWe | 10.5 | 10.5 |
| Power Output Relative | 1.0 | 1.0 |
| Carbon Monoxide Emission Relative | 1.0 | 0.19 |
| Nitrogen Oxides | 1.0 | 2.64 |

TABLE 2-continued

Continuous Engine Trials Using Tallow and Diesel Oil

| Properties | Diesel Oil 21% Oxygen | Tallow 26% Oxygen |
|---|---|---|
| Emission Relative | | |
| Fuel Consumption Relative | 1.0 | 1.13 |
| Peak Cylinder Pressure Relative | 1.0 | 0.53 |
| Actual Exhaust Temperature ° C. | 507 | 510 |

At 10.5 kWe power, the concentration of carbon monoxide in the exhaust gas when running oxygen enriched tallow was only some 20% of the level produced by naturally aspirated diesel oil. The smoke coming from the engine was also much cleaner.

The peak cylinder pressure, an indication of the mechanical stress being placed on the engine, was also halved and was physically characterised by the engine running quieter and with less vibration. The drop in peak cylinder pressure with oxygen enriched tallow is attributable to the combustion having a shorter delay period, that is the fuel ignites earlier than normal in the combustion chamber. The fuel then has a longer time to burn, which results in a reduced peak cylinder pressure but higher mean pressures and temperatures.

The increased fuel consumption of tallow in Table 2 wholly relates to the lower calorific value of tallow compared to diesel fuel oil.

Even more surprisingly, it was found that with tallow and oxygen enrichment the engine could be run at power outputs well beyond the maximum limit recommended by the engine manufacturer, whilst maintaining carbon monoxide emissions at acceptable levels. This is illustrated in Table 3 where the results of running the engine with tallow and oxygen enrichment at a power output of 13-kWe, is compared with running normally aspirated diesel oil at 10.5-kWe and at 12-kWe. For ease of comparison, most results in Table 3 are expressed relative to the engine running on diesel at 10.5-kWe.

TABLE 3

Continuous Engine Trials Using Tallow and Diesel Oil

| Properties | Diesel Oil 21% Oxygen | Diesel Oil 21% Oxygen | Tallow 26% Oxygen |
|---|---|---|---|
| Actual Power Output kWe | 10.5 | 12.0 | 13.0 |
| Power Output Relative | 1.0 | 1.14 | 1.24 |
| Carbon Monoxide Emission Relative | 1.0 | >>3.30 | 1.27 |
| Nitrogen Oxides Emission Relative | 1.0 | 1.04 | 3.67 |
| Actual Exhaust Temperature ° C. | 507 | 625 | 690 |

Increasing the power to 12-kWe, with naturally aspirated diesel fuel oil, dramatically increased the concentration of carbon monoxide in the exhaust gas stream by well over 300% compared to running at 10.5-kWe power. The carbon monoxide emission level was actually beyond the limit that could be reliably recorded by the exhaust gas monitoring equipment. The engine was also emitting black smoke.

The engine manufacturer recommended a maximum smoke limited power output of 11-kWe when using diesel oil. The results of running the engine naturally aspirated with diesel oil at a power of 12-kWe confirmed that the engine was probably well beyond its maximum sustainable power level.

In contrast, with tallow and oxygen enrichment, it was possible to run the engine at an even higher power output of 13-kWe, whilst still maintaining the level of carbon monoxide in the exhaust gas at a relatively low level. The carbon monoxide concentration was only 27% higher than when the engine was run naturally aspirated on diesel oil at 10.5-kWe power.

The exhaust smoke was still relatively clean and free from excessive levels of hydrocarbon materials and particulates. 13-kWe is some 40% higher than the recommended optimum continuous power output for diesel oil and about 18% above the recommended maximum power rating.

The high exhaust temperature of 690° C. confirmed that the tallow was being burned at an increased mean temperature in the combustion chamber of the engine as compared to the temperatures associated with combustion of conventional diesel fuels. In contrast, the exhaust temperature when running diesel oil at the unsustainable power output of 12-kWe was only 625° C.

The emissions of nitrogen oxides (NOx) also increased significantly at the higher output. Based on the research results, theoretical models were compiled to examine the factors that affected the formation of nitrogen oxides (NOx) inside the combustion chamber. These models suggested the following:

It is known that nitrogen and oxygen molecules start to react together to form NOx at temperatures above 2000° K.

Increasing the oxygen concentration provides earlier ignition of the fuel.

Increasing the oxygen concentration enables more of the fuel to be burned, which in turn raises the mean temperature in the combustion chamber.

Increasing the oxygen concentration at a fixed temperature above 2000° K. increases NOx formation in direct proportion to the relative oxygen concentration.

At temperatures above 2000° K., NOx production increases exponentially with increases in temperature.

At temperatures above 2000° K., NOx production increases exponentially with increases in time at the elevated temperature.

Nitrogen oxides are undesirable exhaust pollutants because they are indirect greenhouse gases. They can contribute towards global warming by assisting in the formation of other greenhouse gases, such as tropospheric ozone. Nitrogen oxides can also have an acid rain impact in the atmosphere. However, with regard to the combustion of tallow, a high level of nitrogen oxides in the exhaust gas is an indication of effective, high temperature incineration. In the method of the invention, the high level of nitrogen oxides in the exhaust gas can be abated by catalytic reduction with ammonia and reduced back down to a concentration usually associated with conventional power generation using diesel engines.

At a power output of 13 kWe, the level of NOx in the exhaust gas was some 40% higher than at a power output of 10.5 kWe, even though the concentration of oxygen in the combustion chamber was the same (i.e. 26% oxygen). This large increase in NOx is confirmation that either the mean combustion temperature, or the length of the time of combustion, or both, has increased at the higher power output.

The higher mean combustion temperature will result in greater heat loss to the metal components of the engine. However, the heat that is transferred to the engine components can be utilised for other purposes by passing the coolant, which circulates around the engine, through a heat exchanger.

Being able to run efficiently at a significantly increased continuous power output is of great benefit when using tallow as a fuel. The mean combustion temperature is increased, as illustrated by the high exhaust temperature and increased nitrogen oxide levels, and this helps to ensure that any contaminants that may be present in the tallow will be completely incinerated. Also the hot exhaust gas can be held at a high temperature for a period of time in an insulated exhaust tube to ensure further sterilisation of the exhaust gas stream.

The ability to be able to run efficiently and continuously at an increased power output is of particular benefit when the power produced is used to generate electricity. The increased power from the engine can be used to directly generate more electricity. The hotter than normal exhaust gas can also raise steam more efficiently in a boiler, to provide steam to drive a steam turbine, which in turn drives a generator to produce more electricity. This suggests that the efficiency of the power generation system could be between 55% and 60%, a significantly higher level than conventional power generating operations that use standard diesel fuelled engines.

To show that the engine could be run for long periods at a continuous high power output, whilst using tallow and oxygen enrichment, the engine was run for 100 hours. The performance of the engine remained consistent throughout. At the end of the run, the pistons, valves and fuel injectors in the engine were in good condition and showed no evidence of carbonaceous deposit build up.

As stated in the introduction above, the invention is also applicable to combustion of waste cooking oils.

Table 4 compares the results of combusting tallow and a typical filtered waste cooking oil, which had been collected from a recycling facility, at a power output of 10.5 kWe and 5% oxygen enrichment. The waste cooking oil was of mixed origin and contained both animal and vegetable based oils and fats. The results are compared relatively against those obtained from the combustion of diesel oil under naturally aspirated conditions.

TABLE 4

Engine Trials Comparing Tallow Waste Cooking Oil & Diesel Oil

| Properties | Diesel Oil 21% Oxygen | Tallow 26% Oxygen | Waste Cooking Oil 26% Oxygen |
|---|---|---|---|
| Actual Power Output kWe | 10.5 | 10.5 | 10.5 |
| Power Output Relative | 1.0 | 1.0 | 1.0 |
| Carbon Monoxide Emission Relative | 1.0 | 0.19 | 0.18 |
| Nitrogen Oxides Emission relative | 1.0 | 2.64 | 2.70 |
| Fuel Consumption Relative | 1.0 | 1.13 | 1.15 |
| Actual Exhaust Temperature ° C. | 507 | 510 | 528 |

Figure 2:
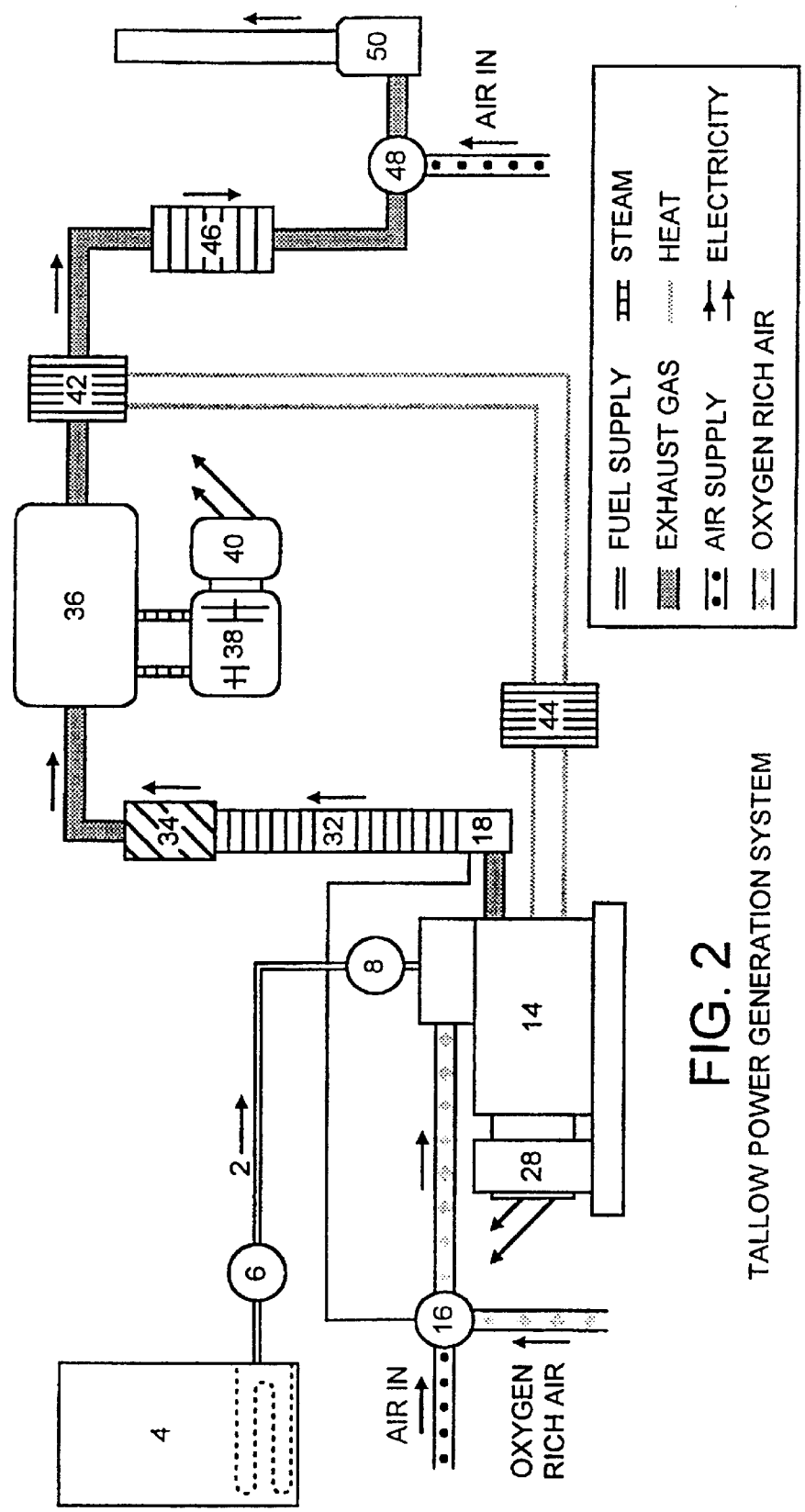
FIG. 2 is a schematic illustration of a power generation system embodying the invention.
Figure 3:
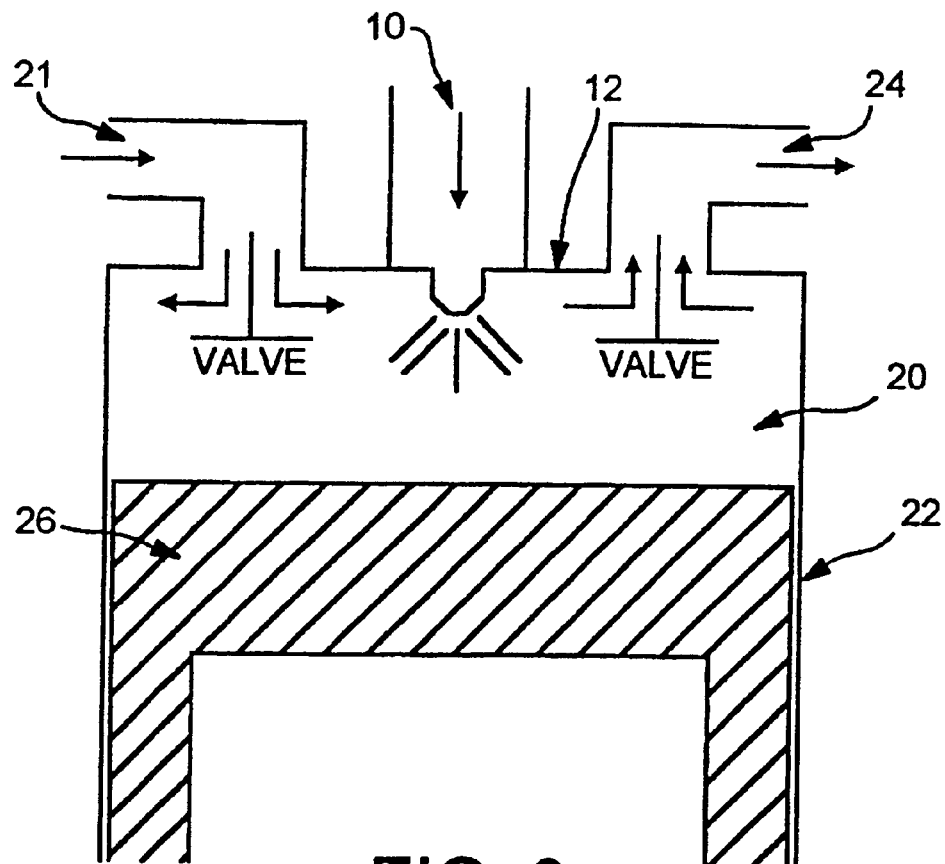
FIG. 3 is a schematic illustration of the cylinder head of a diesel engine.

Having discussed the mechanism of the combustion process above, a power generation system employing the invention is illustrated with reference to FIGS. 2 and 3.

In the embodiment, pre-filtered tallow 2 is contained in liquid form in a storage tank 4 maintained at a temperature of about 50° C. A pump 6 pumps the liquid tallow 2 from tank 4 via a control valve 8 to a fuel injection valve 10 in the cylinder head 12 of a high speed compression ignition engine 14.

Air rich in oxygen is pumped from a gas separation module (not shown) to a control valve 16 that controls the concentration of oxygen in the air supplied to the engine 14 by selectively admitting atmospheric air to the oxygen rich air. The control valve 16 adjusts the oxygen concentration in the air supply to the engine, to provide the required optimum running conditions, in response to a sensor 18 which analyses the exhaust gas stream (preferably the CO levels in the exhaust) coming from the engine 14. The supply of oxygen rich air can be by any suitable known means, including gas separation membranes, pressure swing adsorption, vacuum swing adsorption or cryogenic systems.

The outlet of the control valve 16 is connected to the air intake manifold of the engine 14 and the oxygen-enriched air (typically having an oxygen concentration of 25%–26%) is introduced to the combustion chamber 20 of a cylinder 22 via the air inlet valve 21. At this time the exhaust valve 24 is closed. A piston 26 moving up cylinder 22 compresses the air and a small discrete amount of tallow is sprayed into the combustion chamber 20 by the fuel injection valve 10. On further compression the tallow ignites and the enriched oxygen air ensures that the tallow is effectively and completely combusted. The increase in pressure inside the combustion chamber forces the piston 26 back down the cylinder 22 and this movement is transmitted to a power take off shaft that drives a generator 28 to produce electricity.

When the piston 26 returns back up the cylinder 22 on its exhaust stroke, the hot exhaust gas is emitted from the engine through exhaust valve 30.

A sensor 18 in the exhaust gas stream is primarily used to monitor carbon monoxide concentration, but it may also be convenient to monitor the exhaust gas temperature and the emission levels of other pollutants such as nitrogen oxides. The engine is run at above normal power output to provide a high exhaust gas temperature of preferably between 500° and 800° C. Once the system is set up and the engine is running at continuous power output, any deviation from the predetermined desired level of CO in the exhaust gas stream can be compensated by altering the oxygen inlet concentration. The engine operation will therefore be controlled mainly in dependence on CO measurement from sensor 18. Other engine operating parameters are measured by the inbuilt engine management system and these can also be adjusted to ensure smooth running of the engine. However, the engine typically will be operated at its optimum speed, ie at its point of maximum thermal efficiency, that is when the maximum Brake Mean Effective Pressure was achieved throughout the engine revolution range. Sensor 18 is linked to control valve 16, which is able to adjust the level of oxygen enrichment as required to provide optimum engine operation.

The exhaust gas passes along a well-insulated tube 32 to ensure that it is maintained at an elevated temperature to further sterilise the exhaust gas stream. The exhaust gas enters a catalytic reduction unit 34 that utilises ammonia to reduce the elevated concentration of nitrogen oxides down to an environmentally acceptable level. The reactions in the catalytic reduction unit 34, tend to further raise the exhaust gas temperature slightly by some 30° C.

The hot exhaust gas is used to produce steam in a boiler 36 and the steam is used to drive a steam turbine 38 that in turn drives a generator 40 to produce more electricity. The exhaust gas passes through a heat exchanger 42 to cool the gas. Coolant from the engine cooling system also passes through a heat exchanger 44. Heat from the heat exchangers 42, 44 can be used locally, for example, to heat the tallow storage tank 2. The cool exhaust gas passes through a filter 46 to remove any particulate matter and the exhaust gas is diluted with air at an air blower 48 before being released to the atmosphere through the flue 50.

From the above, it will be seen that the present invention allows for the efficient combustion, at high temperature, of tallow that may possibly be infected by biological contamination. The tallow can be combusted in a standard design of high-speed compression ignition engine operating at its optimum speed, by introducing an enriched oxygen atmosphere to the combustion chamber and running the engine at a higher than normally expected continuous power output. The power output may even exceed the maximum smoke limited power rating recommended by the engine manufacturer. Running the engine under these conditions ensures that the mean temperature in the combustion chamber is significantly increased. The extra heat generated inside the combustion chamber and in the exhaust gas stream will ensure that the tallow will be effectively combusted and any biological contaminants present in the tallow will be completely destroyed.

The invention also provides for the efficient generation of electricity. Coupling the output shaft of the engine to an electrical generator enables the higher than normal power output to be used to efficiently generate electricity. The hotter than normal exhaust gases can be used to efficiently raise steam to drive a steam turbine, which in turn drives a further generator to produce more electricity.

Although the research was carried out on a high-speed compression ignition engine, the method of the invention would also be applicable to low speed compression ignition engines that are also used for power generation applications. These types of engine usually have much larger cylinder bores than high-speed engines, however, their method of operation is similar.

As mentioned previously, the method of the invention could also be used to effectively combust other animal based oils and fats, in virgin, waste or contaminated states. These oils and fats could be derived from animals, particularly ruminants such as sheep, goats, deer and buffalo, which may also be susceptible to BSE type infections.

The method of the invention also provides an effective method of combusting waste oil including used cooking oil at high temperatures and thus destroying any thermally stable organic chemical contaminants that may be present in the oil.

Cooking oil that has been collected for recycling could be of either animal or vegetable origin or, more likely, a mixture of both. Vegetable oils have a chemical composition that is very different from diesel oil and, like tallow, they normally burn poorly in compression ignition engines and form either carbonaceous or gummy deposits in the combustion chamber. However, trials using the test engine indicated that in an enriched oxygen atmosphere vegetable oils burn cleanly in a similar manner to tallow.

What is claimed is:

1. A method of disposing of a product selected from the group containing unrefined tallow, potentially contaminated unrefined tallow and waste cooking oil consisting wholly or partly of animal fats and being potentially contaminated with hazardous material, comprising supplying said product to the combustion chamber of a compression ignition engine, said product being filtered, and in the case of tallow preheated, wherein an enriched oxygen atmosphere is provided in the combustion chamber of the engine to combust said product, and wherein the engine is operated at a continuous power output that is higher than the continuous power output normally recommended by the engine manufacturer for operation with normal diesel fuel oil.

2. A method as claimed in claim 1, wherein the engine is a high-speed compression ignition engine.

3. A method as claimed in claim 1, wherein the engine is a slow speed, wide-bore compression ignition engine.

4. A method as claimed in claim 1, wherein the combustion atmosphere is enriched with oxygen to between 3 and 6% above normal (24% oxygen, 76% nitrogen and 27% oxygen, 73% nitrogen).

5. A method as claimed in claim 1, wherein the combustion atmosphere is enriched with oxygen to between 4 and 5% above normal which are 25% oxygen, 75% nitrogen and 26% oxygen, 74% nitrogen.

6. A method as claimed in claim 1, wherein the level of oxygen enrichment is controlled in dependence on an analysis of the exhaust gases.

7. A method as claimed in claim 1, wherein the level of oxygen enrichment is controlled in dependence on the carbon monoxide level in the exhaust gas stream.

8. A method as claimed in claim 7, wherein said level of oxygen enrichment is controlled so as to maintain the carbon monoxide concentration in the exhaust gas stream at a predetermined level.

9. A method as claimed in claim 1, wherein the engine is operated at a constant speed.

10. A method as claimed in claim 1, wherein the engine is operated at an optimum speed corresponding to the speed giving maximum thermal efficiency.

11. A method as claimed in claim 1, wherein after leaving the engine the exhaust gases are held for a period of time at an elevated temperature.

12. A method as claimed in claim 11, wherein said exhaust gas temperature is between 500 and 800° C.

13. A method as claimed in claim 1, wherein the level of nitrogen oxides in the exhaust gases is reduced by means of catalytic reduction with ammonia.

14. A method as claimed in claim 1, wherein the engine is used to generate electricity by coupling the engine to an electrical generator.

15. A method as claimed in claim 1, wherein the hot exhaust gases from the engine are used to raise steam in a steam boiler.

16. A method as claimed in claim 15, wherein steam from the boiler drives a steam turbine, which in turn drives an electrical generator.

17. An electrical power generating system comprising a supply of potentially contaminated unrefined tallow or waste cooking oil potentially contaminated with hazardous material and consisting wholly or at least partly of animal fat, at least one compression ignition engine, means for admitting said tallow or waste cooking oil into the combustion chamber of said engine, means for creating an enriched oxygen atmosphere in the combustion chamber of said engine for combustion of said tallow or said waste cooking oil, said engine being configured and arranged to operate at a continuous power output that is higher than the continuous power output normally recommended by the engine manufacturer for operation with normal diesel fuel oil, and a generator connected to said engine.

18. A system for disposing of potentially contaminated unrefined tallow or waste cooking oil potentially contaminated with hazardous material and consisting wholly or at least partly of animal fat, said system comprising a supply of said tallow or said cooking oil, a compression ignition engine, means for admitting said tallow or waste cooking oil into the combustion chamber of said engine, means for creating an enriched oxygen atmosphere in the combustion chamber of said engine for combustion of said tallow or said waste cooking oil, said engine being configured and arranged to operate at a continuous power output that is higher than the continuous power output normally recommended by the engine manufacturer for operation with normal diesel fuel oil.

19. A method of combusting tallow in a standard high-speed compression ignition engine that is operating at its optimum speed, by introducing an enriched oxygen atmosphere into the combustion chamber of the engine and running the engine at a much higher continuous power output than would normally be expected from said engine.

20. A method of combusting tallow in a compression ignition engine wherein an enriched oxygen atmosphere is provided in the combustion chamber of the engine and wherein the engine is operated at a continuous power output that is higher than the continuous power output normally recommended by the engine manufacturer for operation with normal diesel fuel oil.

21. A method of combusting waste cooking oil consisting wholly or partly of animal fats and being potentially contaminated with hazardous material in a compression ignition engine wherein an enriched oxygen atmosphere is provided in the combustion chamber of the engine and wherein the engine is operated at a continuous power output that is higher than the continuous power output normally recommended by the engine manufacturer for operation with normal diesel fuel oil.

22. A method of combusting animal based oils or fats, in waste or contaminated state in a compression ignition engine wherein an enriched oxygen atmosphere is provided in the combustion chamber of the engine and wherein the engine is operated at a continuous power output that is higher than the continuous power output normally recommended by the engine manufacturer for operation with normal diesel fuel oil.

23. A method of combusting a mixture of animal or vegetable-based oil or fat in a compression ignition engine wherein an enriched oxygen atmosphere is provided in the combustion chamber of the engine and wherein the engine is operated at a continuous power output that is higher than the continuous power output normally recommended by the engine manufacturer for operation with normal diesel fuel oil.

\* \* \* \* \*